United States Patent
Nonaka et al.

(10) Patent No.: US 7,662,250 B2
(45) Date of Patent: Feb. 16, 2010

(54) PRODUCTION METHOD OF DIELECTRIC CERAMIC COMPOSITION AND PRODUCTION METHOD OF ELECTRONIC DEVICE

(75) Inventors: Tomoaki Nonaka, Nikaho (JP); Hiroshi Sasaki, Nikaho (JP); Tsutomu Odashima, Nikaho (JP); Tetsuo Takaishi, Nikaho (JP); Takahiro Harada, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/076,423

(22) Filed: Mar. 18, 2008

(65) Prior Publication Data
US 2008/0236723 A1 Oct. 2, 2008

(30) Foreign Application Priority Data
Mar. 29, 2007 (JP) .............................. 2007-089730

(51) Int. Cl.
C03B 29/00 (2006.01)
C04B 35/00 (2006.01)
(52) U.S. Cl. ................. 156/89.14; 156/89.11; 501/134; 501/135; 501/136; 501/137
(58) Field of Classification Search ................. 264/681; 156/89.11, 89.14; 501/134, 135, 136, 137
See application file for complete search history.

(56) References Cited

U.S. PATENT DOCUMENTS

| 6,301,092 | B1 | 10/2001 | Hata et al. | |
| 2006/0088719 | A1* | 4/2006 | Ito et al. | 428/469 |
| 2007/0045912 | A1* | 3/2007 | Sasaki et al. | 264/681 |

FOREIGN PATENT DOCUMENTS

| JP | A-2001-6966 | | 1/2001 |
| JP | A-2002-293617 | | 10/2002 |
| JP | 2004107200 | * | 4/2004 |
| JP | A 2004-107200 | | 4/2004 |

* cited by examiner

*Primary Examiner*—Mark A Osele
*Assistant Examiner*—Nickolas Harm
(74) *Attorney, Agent, or Firm*—Oliff & Berridge, PLC (57) ABSTRACT

A production method of a dielectric ceramic composition at least including a main component including a dielectric oxide having perovskite-type crystal structure expressed by a formula $ABO_3$ (note that in the formula, "A" indicates one or more elements selected from Ba, Ca, Sr and Mg, and that "B" indicates one or more elements selected from Ti, Zr and Hf) comprises steps of preparing a main component material including said dielectric oxide expressed by $ABO_3$; preparing a subcomponent material including a composite oxide expressed by $M_4R_6O(SiO_4)_6$ (note that "M" indicates at least one selected from Ca and Sr, and that "R" indicates at least one selected from Sc, Y, La, Ce, Pr, Nd, Pm, Sm, Eu, Gd, Tb, Dy, Ho, Er, Tm, Yb and Lu); mixing said main component material and subcomponent material to obtain a dielectric ceramic composition material; and firing said dielectric ceramic composition material.

9 Claims, 2 Drawing Sheets

PRODUCTION METHOD OF DIELECTRIC CERAMIC COMPOSITION AND PRODUCTION METHOD OF ELECTRONIC DEVICE

BACKGROUND OF THE INVENTION

1. Field of the Invention

The present invention relates to production method of dielectric ceramic composition and production method of electronic device. The present invention further particularly relates to production method of dielectric ceramic composition, capable to improve breakdown voltage and lifetime characteristic as well as good specific permittivity, dielectric loss and capacitance-temperature characteristic, and production method of electronic device.

2. Description of the Related Art

A multilayer ceramic capacitor, an example of electronic devices, for example, is manufactured by firing a green chip obtained by stacking alternately ceramic green sheets comprising pre-determined dielectric ceramic composition and internal electrode layers in a pre-determined pattern to be integrated. Since the internal electrode layer of multilayer ceramic capacitor is integrated with the ceramic dielectric body by firing, a material not reacted with the ceramic dielectric body needs to be selected. Therefore, as a material constituting the internal electrode layer, there has been no choice but using expensive noble metal such as platinum and palladium.

On the other hand, dielectric ceramic composition wherein inexpensive base metal such as nickel and copper can be used has been recently developed to attain significant cost reduction. Among such dielectric ceramic compositions, for example, Japanese Unexamined Patent Publication 2004-107200 (patent article 1) proposes dielectric ceramic composition comprising a main crystal particle consisting of perovskite-like composite oxide including Ba, Ti, rare-earth element, Mg and Mn, and two-sided grain boundary phase and triple point grain boundary phase formed by the main crystal particle, wherein in the triple point grain boundary phase, at least $M_4R_6O(SiO_4)_6$-type crystal phase (M is at least one element selected from alkaline earth elements and "R" is at least one element selected from rare-earth elements) is precipitated. An object of the patent article 1 is to provide a dielectric ceramic composition with high breakdown voltage and good capacitance-temperature characteristic even when using it for a thin dielectric layer with a thickness of 3 μm or less.

In the patent article 1, a composition having the above constitution is in particular manufactured in the following method. Namely, the surface of raw powder comprising of $BaTiO_3$ is first coated with oxides of rare-earth element, Mg and Mn, to prepare coated $BaTiO_3$ powder; then, to the coated $BaTiO_3$ powder, powder including oxides of alkaline earth elements and Si ($SiO_2$) is mixed to obtain dielectric powder; and the obtained dielectric powder is fired in a reduced atmosphere, followed by heat treatment under an atmosphere with higher oxygen concentration than the reduced atmosphere.

Particularly, the patent article 1 discloses that by employing such a production method, the $M_4R_6O(SiO_4)_6$-type crystal phase can be precipitated uniformly in the triple point grain boundary phase. However, the patent article 1 allows improving breakdown voltage, but improvement in lifetime characteristic is insufficient, resulting in lower reliability.

SUMMARY OF THE INVENTION

A purpose of the present invention, reflecting this situation, is to provide a production method of a dielectric ceramic composition with improved breakdown voltage and lifetime characteristic as well as maintaining the other preferable electric properties (for example, a specific permittivity, a dielectric loss and capacitance-temperature characteristic), used as a dielectric layer of an electronic device such as a multilayer ceramic capacitor. Another purpose of the present invention is to provide electronic devices such as a multilayer ceramic capacitor having the above properties.

As a result of keen examinations, the present inventors have found the above purposes can be attained by using a composite oxide expressed by $M_4R_6O(SiO_4)_6$ (note that "M" is at least one selected from Ca and Sr, and "R" is at least one selected from Sc, Y, La, Ce, Pr, Nd, Pm, Sm, Eu, Gd, Tb, Dy, Ho, Er, Tm, Yb and Lu) as a Si-containing compound included in the dielectric ceramic composition, and firing it with a main component, a dielectric oxide having perovskite-type crystal structure expressed by $ABO_3$, when producing a dielectric ceramic composition; and came to complete the present invention based on the findings.

Namely, according to the present invention, there is provided a production method of a dielectric ceramic composition at least including a main component including a dielectric oxide having perovskite-type crystal structure expressed by a formula $ABO_3$ (note that in the formula, "A" indicates one or more elements selected from Ba, Ca, Sr and Mg, and that "B" indicates one or more elements selected from Ti, Zr and Hf), comprising steps of:

preparing a main component material including said dielectric oxide expressed by $ABO_3$;

preparing a subcomponent material including a composite oxide expressed by $M_4R_6O(SiO_4)_6$ (note that "M" indicates at least one selected from Ca and Sr, and that "R" indicates at least one selected from Sc, Y, La, Ce, Pr, Nd, Pm, Sm, Eu, Gd, Tb, Dy, Ho, Er, Tm, Yb and Lu);

mixing said main component material and subcomponent material to obtain a dielectric ceramic composition material; and firing said dielectric ceramic composition material.

Also, according to the present invention, there is provided a production method of an electronic device having a dielectric layer, comprising steps of:

preparing a main component material including a dielectric oxide having perovskite-type crystal structure expressed by a formula $ABO_3$ (note that in the formula, "A" indicates one or more elements selected from Ba, Ca, Sr and Mg, and "B" indicates one or more elements selected from Ti, Zr and Hf);

preparing a subcomponent material including a composite oxide expressed by $M_4R_6O(SiO_4)_6$ (note that "M" indicates at least one selected from Ca and Sr, and "R" indicates at least one selected from Sc, Y, La, Ce, Pr, Nd, Pm, Sm, Eu, Gd, Tb, Dy, Ho, Er, Tm, Yb and Lu);

mixing said main component material and subcomponent material to obtain a dielectric ceramic composition material;

mixing said dielectric ceramic composition material, an organic binder, and a solvent to obtain a dielectric paste;

obtaining a ceramic green sheet by using said dielectric paste;

stacking a plurality of said ceramic green sheets to obtain a green chip; and firing said green chip.

Preferably, in said composite oxide expressed by $M_4R_6O(SiO_4)_6$, "M" is Ca.

Preferably, "R" is at least one selected from Y, Ho, Dy, Gd, Yb and Tb, and more preferably, at least one selected from Y, Ho and Dy.

Preferably, said dielectric oxide expressed by $ABO_3$ is barium titanate.

Preferably, said subcomponent material further includes an oxide of Mg and an oxide of Ba.

Preferably, when a content of Si-containing compound included in said dielectric ceramic composition, calculated as a conversion weight percent of the Si element in the oxide, is 100 wt %, 50 to 100 wt % of Si-containing compound included in said dielectric ceramic composition is added to said dielectric ceramic composition material in a form of said $M_4R_6O(SiO_4)_6$.

An electronic device according to the present invention is not particularly limited, and there may be mentioned a multilayer ceramic capacitor, piezo element, chip inductor, chip varistor, chip thermistor, chip resistor and other surface mount chip-type electronic devices (SMD).

In the present invention, when producing a dielectric ceramic composition, Si-containing compound included in the dielectric ceramic composition is added in a form of a composite oxide expressed by $M_4R_6O(SiO_4)_6$ to be fired with a main component, dielectric oxide having perovskite-type crystal structure expressed by $ABO_3$. Therefore, according to the present invention, the obtained dielectric ceramic composition can be excellent in breakdown voltage and lifetime characteristic as well as maintaining the other preferable electric properties (for example, a specific permittivity, a dielectric loss and capacitance-temperature characteristic). Particularly, in the present invention, by adding the Si-containing compound in the form of composite oxide expressed by $M_4R_6O(SiO_4)_6$, it is possible to diffuse an "R" element and Si element near the surfaces of dielectric particles constituting the dielectric ceramic composition, so that a diffusive phase can be formed in the dielectric particle. Thus-formed diffusive phase allows to improve breakdown voltage and lifetime characteristic.

On the other hand, in the above-mentioned patent article 1, Si-containing compound is added in the form of $SiO_2$ instead of composite oxide expressed by $M_4R_6O(SiO_4)_6$, so that the fired dielectric ceramic composition has a constitution that $M_4R_6O(SiO_4)_6$ crystal phase is segregated. However, if $M_4R_6O(SiO_4)_6$ crystal phase is segregated in this way, "R" element may be incorporated in the segregation phase but not diffused in the dielectric particle, resulting in inferior lifetime characteristic.

In contrast, in the present invention, Si-containing compound is in the form of composite oxide expressed by $M_4R_6O(SiO_4)_6$ beforehand, and adopting the constitution of adding in the form of this composite oxide allows to prevent from forming the segregation phase in the above-mentioned patent article 1, and to diffuse "R" element and Si element in the surfaces of dielectric particles, so that the above characteristics can be obtained.

BRIEF DESCRIPTION OF THE DRAWINGS

Hereinafter, the present invention will be described based on embodiments shown in drawings.

DESCRIPTION OF THE PREFERRED EMBODIMENTS

Figure 1:
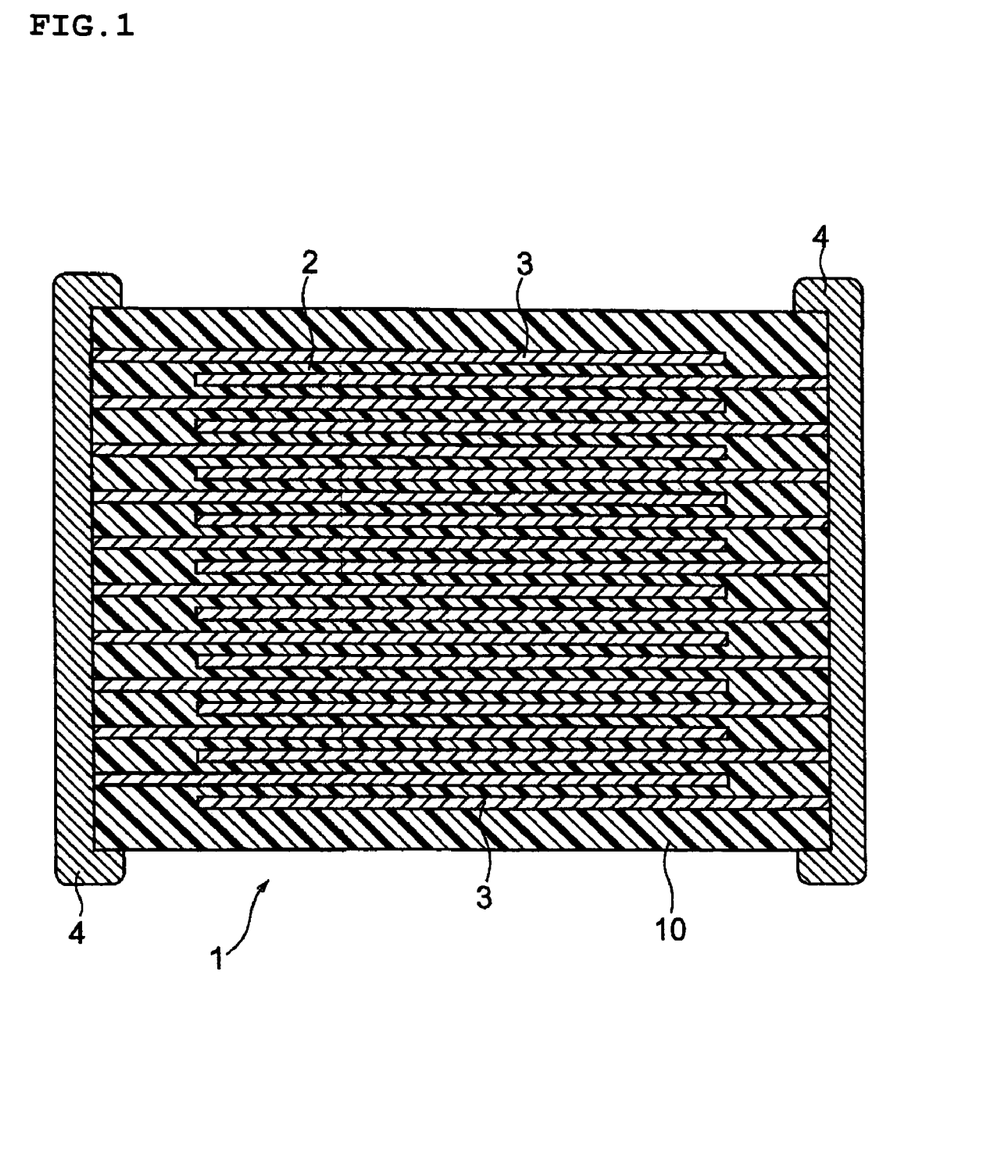
FIG. 1 is a cross-sectional view of a multilayer ceramic capacitor according to an embodiment of the present invention.

As shown in FIG. 1, multilayer ceramic capacitor 1 according to an embodiment of the present invention comprises capacitor device body 10 wherein dielectric layers 2 and internal electrode layers 3 are alternately stacked. At the both end portions of the capacitor device body 10, a pair of external electrodes 4, both connected with internal electrode layers 3 alternately stacked inside the device body 10, is formed. The shape of the capacitor device body 10 is not particularly limited, and is normally rectangular parallelepiped. Also, its dimension is not particularly limited, and may be properly changed as usage.

The internal electrode layers 3 are stacked so that each end face is alternately exposed to a surface of the two opposed end portions of the capacitor device body 10. The pair of external electrodes 4 is formed at both end portions of the capacitor device body 10, and connected with the exposed end faces of the alternately-stacked internal electrode layers 3 to form a capacitor circuit.

The dielectric layer 2 includes the dielectric ceramic composition produced by the production method of the present invention. The dielectric ceramic composition produced by the production method of the present invention comprises a main component including dielectric oxide having perovskite-type crystal structure expressed by a formula $ABO_3$ (note that in the formula, "A" is one or more elements selected from Ba, Ca, Sr and Mg, and that "B" is one or more elements selected from Ti, Zr and Hf.); and as a subcomponent, composite oxide expressed by $M_4R_6O(SiO_4)_6$ (note that "M" is at least one selected from Ca and Sr, and that "R" is at least one selected from Sc, Y, La, Ce, Pr, Nd, Pm, Sm, Eu, Gd, Tb, Dy, Ho, Er, Tm, Yb and Lu).

As the dielectric oxide constituting the main component, for example, $BaTiO_3$, $CaTiO_3$, $SrTiO_3$, $BaZrO_3$, $CaZrO_3$, etc., may be mentioned and can be mixed to use. Also, in addition to the above, there may be mentioned a dielectric oxide wherein "A" site element is Ba and "B" site element is Ti with partial substitution of Ba with other elements such as $(Ba, Ca)TiO_3$, $(Ba, Sr)TiO_3$ and $(Ba, Ca, Sr)TiO_3$; the dielectric oxide wherein "A" site element is further substituted with Mg; and the dielectric oxide wherein "A" site element is Ca and Sr such as $(Ca, Sr)TiO_3$. Further, there may be mentioned a dielectric oxide wherein "B" site element of the above-mentioned $BaTiO_3$ is Zr and Hf instead of Ti, such as $Ba(Ti, Zr)O_3$, $Ba(Ti, Hf)O_3$ and $Ba(Ti,Zr,Hf)O_3$. Note that in the above composition formula, a ratio of each element constituting "A" site and "B" site can be arbitrarily selected, and the ratio of "A" site element and "B" site element, and oxygen (O) amount may slightly deviate from stoichiometric composition in the above formula. Also, the main component is not limited to the above, and "A" site element and "B" site element can be appropriately combined to use in accordance with desired characteristics.

In the present embodiment, among the above-mentioned main components, $BaTiO_3$ is particularly preferable. By using $BaTiO_3$, high specific permittivity can be obtained.

The composite oxide as the subcomponent expressed by $M_4R_6O(SiO_4)_6$ (note that "M" is at least one selected from Ca and Sr, and that "R" is at least one selected from Sc, Y, La, Ce, Pr, Nd, Pm, Sm, Eu, Gd, Tb, Dy, Ho, Er, Tm, Yb and Lu.) is a composite oxide composed of an oxide of M, an oxide of "R" and an oxide of Si. In the present embodiment, the oxides in the form of composite oxide, $M_4R_6O(SiO_4)_6$, is fired with the main component, dielectric oxide expressed by $ABO_3$, so that each element constituting the composite oxide, particularly, "R" element and Si element, can be diffused near the surface of dielectric particle constituted mainly by the above main component to form a diffusive phase. By forming the diffusive phase in the dielectric particle, breakdown voltage and lifetime characteristic can be improved.

In the composite oxide expressed by $M_4R_6O(SiO_4)_6$, "M" element is at least one selected from Ca and Sr, and they may be used together. In the present embodiment, as "M" element, Ca is more preferable.

In the composite oxide expressed by $M_4R_6O(SiO_4)_6$, "R" element may be any element mentioned above. Based on the perspective that effects of characteristic improvement are large, at least one selected from Y, Ho, Dy, Gd, Yb and Tb is preferable, at least one selected from Y, Ho and Dy is more preferable and Y is particularly preferable.

A content of $M_4R_6O(SiO_4)_6$ is preferably 0.1 to 10 moles, more preferably 0.2 to 5 moles when calculated as a conversion of the Si element with respect to 100 moles of the main component. When the content of $M_4R_6O(SiO_4)_6$ is too low, improvement effects of breakdown voltage and lifetime characteristic may not be obtained. On the other hand, when too large, improvement effects of breakdown voltage and lifetime characteristic may not be obtained as well. Note that in the present invention, in the composite oxide expressed by $M_4R_6O(SiO_4)_6$, a ratio of each element may slightly deviate from stoichiometric composition in the above formula.

In the dielectric ceramic composition, as a subcomponent, in addition to $M_4R_6O(SiO_4)_6$, it is preferable to include an oxide of Mg and an oxide of Ba. Further in addition to these, it is more preferable to include at least one selected from an oxide of Y, an oxide of Cr, an oxide of V, an oxide of Ca, an oxide of Cu and an oxide of Co.

The oxide of Mg has effects to improve both resistance to reduction and lifetime characteristic. The content of Mg oxide is preferably 0.1 to 3 moles, more preferably 0.5 to 2 moles, when calculated as a conversion of MgO with respect to 100 moles of the main component. When the content of Mg oxide is too small, resistance to reduction and lifetime characteristic may be inferior. On the other hand, when the content is too large, there is a tendency to deteriorate sinterability and to lower specific permittivity.

The oxide of Ba has an effect to improve capacitance-temperature characteristic. The content of Ba oxide is preferably 0.01 to 3 moles, more preferably 0.10 to 2 moles, when calculated as a conversion of BaO with respect to 100 moles of the main component. When the content of Ba oxide is too small, temperature change rate of capacitance may increase. On the other hand, when the content is too large, both sinterability and lifetime characteristic tend to be deteriorated.

Also, the contents of oxide of R, the oxide of Cr, oxide of V, oxide of Ca, oxide of Cu and oxide of Co are preferably as follows with respect to 100 moles of the main component.

Namely, the content of the oxide of "R" (R is at least one selected from Sc, Y, La, Ce, Pr, Nd, Pm, Sm, Eu, Gd, Tb, Dy, Ho, Er, Tm, Yb and Lu) is preferably 0.02 to 5 moles, more preferably 0.1 to 2 moles, when calculated as a conversion of "R" element.

The content of the oxide of Ca is preferably 0.05 to 5 moles, more preferably 0.07 to 2 moles, when calculated as a conversion of Ca element.

The content of the oxide of Cr is preferably 0.01 to 1.0 mole, more preferably 0.05 to 0.5 mole, when calculated as a conversion of $Cr_2O_3$.

The content of the oxide of V is preferably 0.001 to 0.2 mole, more preferably 0.01 to 0.1 mole, when calculated as a conversion of $V_2O_5$.

The content of the oxide of Cu is preferably 0.01 to 1.0 mole, more preferably 0.05 to 0.5 mole, when calculated as a conversion of CuO.

The content of the oxide of Co is preferably 0.01 to 1.0 mole, more preferably 0.05 to 0.5 mole, when calculated as a conversion of CoO.

Note that when the oxide of "R" ($R_2O_3$) is included as the subcomponent, the total of an amount calculated as a conversion of "R" in the above composite oxide expressed by $M_4R_6O(SiO_4)_6$ and an amount calculated as a conversion of "R" in the oxide of "R" ($R_2O_3$) is preferably within the above range. Also, when using a compound wherein "M" is Ca (i.e., $Ca_4R_6O(SiO_4)_6$) as the composite oxide expressed by $M_4R_6O(SiO_4)_6$, the total of an amount calculated as a conversion of Ca in the above composite oxide expressed by $M_4R_6O(SiO_4)_6$ and an amount calculated as a conversion of Ca in CaO is preferably within the above range.

Also, at least a part of the subcomponents other than $M_4R_6O(SiO_4)_6$ may be diffused near the surface of the dielectric particle together with "R" element and Si element to form a diffusive phase.

In the dielectric ceramic composition, Si-containing compound other than $M_4R_6O(SiO_4)_6$ may be included within the range not to ruin the effects of the present invention.

As the Si-containing compound, for example, there may be mentioned a composite oxide such as $BaSiO_3$, $CaSiO_3$ and (Ba, Ca) $SiO_3$ as well as an oxide of Si, $SiO_2$. Note that when the total content of the Si-containing compounds included in the dielectric ceramic composition calculated as a conversion of Si element is 100 wt %, a ratio of composite oxide expressed by $M_4R_6O(SiO_4)_6$ in the Si-containing compounds included in the dielectric ceramic composition is preferably in the range of 50 to 100 wt %, particularly preferably in the range of 70 to 100 wt %, when calculated as a conversion of Si. When the ratio of $M_4R_6O(SiO_4)_6$ in the Si-containing compounds included in the dielectric ceramic composition is too low, i.e., when the ratios of Si-containing compounds other than $M_4R_6O(SiO_4)_6$ are too high, improvement effects of breakdown voltage and lifetime characteristic may not be obtained.

The thickness of the dielectric layer 2 is, although not particularly limited, preferably 10 μm or less per layer, more preferably 5 μm or less and further preferably 3 μm or less. The lower limit of the thickness is, although not particularly limited, for example, 0.5 μm or so.

As a conducting material included in the internal electrode layer 3, although not particularly limited, base metal can be used since constituent materials of the dielectric layer 2 have resistance to reduction. The base metal used as the conducting material is preferably Ni or Ni alloy. As the Ni alloy, it is preferable to use an alloy of Ni with one or more elements selected from Mn, Cr, Co and Al. The content of Ni in the alloy is preferably 95 wt % or more. Note that various trace components such as P may be included approximately in an amount of 0.1 wt % or less in the Ni or Ni alloy. The thickness of the internal electrode layer 3 may be properly determined in accordance with application, etc., and usually preferably 0.1 to 3 μm, particularly preferably 0.2 to 2.0 μm or so.

As a conducting material included in the external electrode 4, although not particularly limited, inexpensive Ni, Cu or alloys of these can be used in the present invention. The thickness of the external electrode 4 may be properly determined in accordance with application, etc., and usually preferably 10 to 50 μm or so.

Next, a production method of a multilayer ceramic capacitor according to the present embodiment will be described. The multilayer ceramic capacitor according to the present embodiment is produced, as with traditional multilayer ceramic capacitors, by forming a green chip by a usual printing method or sheet method wherein a paste is used, followed by firing, and printing or transferring an external electrode, followed by firing. Hereinafter, the production method will be specifically described.

First, dielectric ceramic composition material included in a dielectric paste is prepared to make a paste, so that the dielectric paste is obtained.

The dielectric paste may be organic paste obtained by kneading dielectric ceramic composition material and organic vehicle, or water-based paste.

As the dielectric ceramic composition material, in addition to the above-mentioned oxides, the mixture thereof, and composite oxides, various other compounds to become the above-mentioned oxides or composite oxides by firing, for example, carbonate, oxalate, nitrate, hydroxide, organic metallic compounds, etc. may be used by mixing. The content of each compound in the dielectric ceramic composition material may be determined so as to have the above-mentioned constitution of the dielectric ceramic composition after firing. An average particle size of the dielectric ceramic composition material before forming the paste is usually 0.1 to 1 μm or so.

In the present embodiment, as the dielectric ceramic composition material, a main component material including dielectric oxide expressed by $ABO_3$, subcomponent material including composite oxide expressed by $M_4R_6O(SiO_4)_6$ and other optional subcomponent material added if needed are mixed to use.

In the present embodiment, by using a composite oxide expressed by $M_4R_6O(SiO_4)_6$ as a Si-containing compound and mixing it with the main component material to obtain the dielectric ceramic composition material, it is possible that the dielectric ceramic composition obtained by firing the dielectric ceramic composition material is superior in breakdown voltage and lifetime characteristic while maintaining other good electric properties (for example, a specific permittivity, a dielectric loss and capacitance-temperature characteristic). Note that this is considered to be caused by a diffusive phase, formed by diffusing "R" element and Si element constituting $M_4R_6O(SiO_4)_6$ near the surface of the main component at firing since the composite oxide expressed by $M_4R_6O(SiO_4)_6$ is added as the Si-containing compound. Namely, by using the composite oxide expressed by $M_4R_6O(SiO_4)_6$, "R" element and Si element can be efficiently solid soluble in the main component.

As a method to prepare the composite oxide expressed by $M_4R_6O(SiO_4)_6$, although not particularly limited, there may be mentioned a method to use an oxide of M, an oxide of "R" and an oxide of Si and to preliminarily fire them at 850 to 1300° C., sol-gel method and alkoxide method.

Also, in case that optional compounds are included in the dielectric ceramic composition constituting the dielectric layer 2, other than the main component and the composite oxide expressed by $M_4R_6O(SiO_4)_6$, optional compounds may be added when mixing the main component material and the materials of the composite oxide expressed by $M_4R_6O(SiO_4)_6$. Further, in case of using a Si-containing compound other than the composite oxide expressed by $M_4R_6O(SiO_4)_6$, the ratio of the composite oxide expressed by $M_4R_6O(SiO_4)_6$ is preferably in the range of 50 to 100 wt %, particularly preferably in the range of 70 to 100 wt %, when calculated as a conversion of Si element.

The organic vehicle is obtained by dissolving a binder in an organic solvent. The binder used in the organic vehicle is not particularly limited, and may be properly selected from a variety of usual binders such as ethylcellulose and polyvinyl butyral. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric paste, dielectric materials can be kneaded with a water-based vehicle obtained by dissolving an aqueous binder and dispersant in water. The aqueous binder used for water-based vehicle is not particularly limited, and for example, polyvinyl alcohol, cellulose, aqueous acrylic resin, etc., may be used.

An internal electrode layer paste is obtained by kneading conductive materials consisting of the above mentioned various conducting metals and alloys, or various oxides, organic metallic compound and resinate, etc., which become the above-mentioned conducting materials after firing, with the above-mentioned organic vehicle.

An external electrode paste may be obtained as with the above-mentioned internal electrode layer paste.

The content of organic vehicle in each of the above-mentioned pastes is not particularly limited, and may be usual content, for example, 1 to 5 wt % or so of the binder and 10 to 50 wt % or so of the solvent. Also, in each paste, there may be included additives selected from a variety of dispersants, plasticizer, dielectric, insulators, etc., if needed. The total amounts of these is preferably 10 wt % or less.

When using the printing method, dielectric paste and internal electrode layer paste are alternately printed on a substrate such as PET to form layers, and after cutting to a predetermined shape, removed from the substrate to obtain a green chip. Also, when using the sheet method, a green sheet is formed by using dielectric paste, internal electrode layer paste is printed thereon, and then, these are stacked to form a green chip.

Before firing, the green chip is subject to binder removal treatment. The binder removal treatment may be properly determined in accordance with a type of the conducting material in the internal electrode layer paste. When using base metal including Ni and Ni alloy as the conducting material, oxygen partial pressure in the binder removal atmosphere is preferably $10^{-45}$ to $10^5$ Pa. When the oxygen partial pressure is below the above range, binder removal effects may decline. Also, when the oxygen partial pressure exceeds the above range, the internal electrode layer tends to be oxidized.

Additional binder removal conditions include: temperature rising rate of preferably 5 to 300° C./hour, more preferably 10 to 100° C./hour; holding temperature of preferably 180 to 400° C., more preferably 200 to 350° C.; and temperature holding time of preferably 0.5 to 24 hours, more preferably 2 to 20 hours. Also, firing atmosphere is preferably the air or reduced atmosphere, and as atmosphere gas in the reduced atmosphere, for example, it is preferable to use a wet mixed gas of $N_2$ and $H_2$.

The atmosphere at firing of the green chip may be properly determined in accordance with a type of the conducting material in the internal electrode layer paste. When using base metal including Ni and Ni alloy as the conducting material, oxygen partial pressure in the firing atmosphere is preferably $10^{-9}$ to $10^{-4}$ Pa. When the oxygen partial pressure is below the above range, abnormal sintering may be caused in the conducting material in the internal electrode layer, resulting in an electrode breaking. Also, when the oxygen partial pressure exceeds the above range, the internal electrode layer tends to be oxidized.

Also, holding temperature at firing is preferably 1100 to 1400° C., more preferably 1200 to 1350° C. When the holding temperature is below the above range, densification may be insufficient. When it exceeds the above range, abnormal sintering of the internal electrode layer may cause an electrode breaking, capacitance-temperature characteristic may deteriorate due to dispersion of the material constituting the internal electrode layer, and the dielectric ceramic composition may be easily reduced.

Additional firing conditions include: temperature rising rate of preferably 50 to 500° C./hour, more preferably 200 to 300° C./hour; temperature holding time of preferably 0.5 to 8 hours, more preferably 1 to 3 hours; and cooling rate of preferably 50 to 500° C./hour, more preferably 200 to 300° C./hour. Also, firing atmosphere is preferably a reducing atmosphere, and as atmosphere gas, for example, it is preferable to use a wet mixed gas of $N_2$ and $H_2$.

When firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-3}$ Pa or more, particularly preferably $10^{-2}$ to 10 Pa. When the oxygen partial pressure is below the above range, it may be difficult to reoxidize the dielectric layer. When it exceeds the above range, the internal electrode layer tends to be oxidized.

Holding temperature at annealing is preferably 1100° C. or less, particularly preferably 500 to 1100° C. When the holding temperature is below the above range, the dielectric layer may not be sufficiently oxidized, often resulting in lower IR and shorter IR lifetime. On the other hand, when the holding temperature exceeds the above range, the internal electrode layer is not only oxidized to reduce the capacitance, but also reacts with the dielectric body itself, which may easily cause deteriorated capacitance-temperature characteristic, reduced IR, and inferior lifetime characteristic. Note that the annealing may include a temperature rising process and temperature falling process. Namely, the temperature holding time may be zero. In this case, the holding temperature is same as the maximum temperature.

Additional annealing conditions include: temperature holding time of preferably 0 to 20 hours, more preferably 2 to 10 hours; and cooling rate of preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter may be used to wet the $N_2$ gas and mixed gas, for example. In this case, the water temperature is preferably 5 to 75° C. or so.

The binder removal treatment, firing and annealing may be performed continuously or independently.

Thus obtained capacitor device body is then subject to end surface polishing, for example, by barrel-polishing or sand blasting, and the external electrode paste is printed or transferred thereon, followed by firing, so that the external electrode 4 is formed. The preferable firing conditions of the external electrode paste are, for example, in wet mixed gas of $N_2$ and $H_2$; at 600 to 800° C.; and for 10 minutes to 1 hour or so. If needed, a covering layer may be formed on the surface of the external electrode 4 by plating, etc.

Thus produced multilayer ceramic capacitor of the present invention is mounted on the printed-circuit board, etc., by soldering, etc., to use a variety of electronic devices, etc.

Hereinbefore, an embodiment of the present invention is described, but the present invention is not limited to the above-mentioned embodiment and can be variously modified within the scope of the present invention.

For example, in the above-mentioned embodiment, a multilayer ceramic capacitor is exemplified as an electronic device according to the present invention. However, the electronic device according to the present invention is not limited to the multilayer ceramic capacitor and may be any comprising the dielectric layer constituted by the dielectric ceramic composition produced by the above method.

EXAMPLES

Hereinafter, the present invention will be described based on the further detailed examples, but the present invention is not limited to the examples.

Example 1

Sample No. 1

At first, as a starting material, there were prepared $BaTiO_3$ powder (average particle diameter:0.2 μm) which was the main component material, and $Ca_4Y_6O(SiO_4)_6$, $Y_2O_3$, MgO, $Cr_2O_3$, $V_2O_5$, and BaO which were the subcomponent materials. As $Ca_4Y_6O(SiO_4)_6$, the predetermined ratios of CaO, $Y_2O_3$ and $SiO_2$ were mixed in a ball mill, and preliminarily fired at 1100° C. for 2 hours.

Also, a ratio of each subcomponent to $BaTiO_3$ was as follows:

$Ca_4Y_6O(SiO_4)_6$:0.60 mole (calculated as a conversion of Si)

$Y_2O_3$:0.60 mole (calculated as a conversion of Y)

MgO:1.50 moles $Cr_2O_3$:0.20 mole $V_2O_5$:0.07 mole

BaO:0.36 mole.

Note that the above ratio of $Ca_4Y_6O(SiO_4)_6$ was calculated as a conversion of Si; the ratio calculated as a conversion of Y was 0.60 mole; and the ratio calculated as a conversion of Ca was 0.40 mole. Also, the ratio of $Y_2O_3$ was calculated as a conversion of Y, and the ratio calculated as a conversion of the oxide, $Y_2O_3$, was 0.30 mole. On the other hand, the ratios of MgO, $Cr_2O_3$, $V_2O_5$ and BaO were calculated as a conversion of each oxide.

Next, the main component material and each subcomponent material were wet mixed in the ball mill for 16 hours, and dried to obtain the dielectric ceramic composition material.

100 parts by weight of the obtained dielectric ceramic composition material, 6 parts by weight of acrylic resin, 6 parts by weight of toluene, 3.5 parts by weight of methyl ethyl ketone, 6 parts by weight of mineral spirit, and 4 parts by weight of acetone were mixed in the ball mill to form a paste, so that the dielectric paste was obtained.

In addition to the above, 100 parts by weight of Ni particle with an average particle size of 0.2 to 0.8 μm, 40 parts by weight of organic vehicle (8 parts by weight of ethylcellulose dissolved in 92 parts by weight of butyl carbitol) and 10 parts by weight of butyl carbitol were kneaded by triple rolls to form a paste, so that the internal electrode layer paste was obtained.

Using the obtained dielectric paste, a sheet was formed on the PET film by the doctor blade method and dried to obtain a green sheet. The thickness of the green sheet was 2.5 μm. The internal electrode layer paste was printed thereon, followed by removing the sheet from the PET film. Then, the green sheets and protective green sheet (the sheet without printing the internal electrode layer paste) were stacked and pressed to bond to obtain a green chip.

Next, the green chip was cut to the predetermined size, followed by binder removal treatment, firing and annealing in the following conditions, to obtain a multilayer ceramic fired body.

The binder removal treatment was performed at temperature rising rate: 30° C./hour, holding temperature: 275° C., holding time: 8 hours, and atmosphere: in the air.

The firing was performed at temperature rising rate: 200° C./hour, holding temperature: 1180 to 1210° C., holding time: 2 hours, oxygen partial pressure: $5 \times 10^{-12}$ Pa, and atmosphere: $H_2$—$N_2$—$H_2O$ gas.

The annealing was performed at temperature rising rate: 200° C./hour, holding temperature: 900 to 1100° C., holding time: 2 hours, oxygen partial pressure: $1 \times 10^{-6}$ Pa, and atmosphere: wet $N_2$ gas.

Note that a wetter with water temperature of 35° C. was used to wet the atmosphere gas at the firing and reoxidation treatment.

Then, after polishing end faces of the obtained multilayer ceramic fired body with sandblast, In—Ga was coated as the external electrode to obtain a sample of the multilayer ceramic capacitor shown in FIG. 1 (Sample No. 1 in Tables 1 and 2). The size of the obtained capacitor was 3.2 mm×1.6 mm×0.6 mm; the number of the dielectric layers sandwiched by the internal electrode layers was 100 layers; the thickness per dielectric layer (interlayer thickness) was 2.0 μm; and the thickness of the internal electrode layer was 1.5 μm.

For the obtained capacitor sample, an average particle size of the dielectric particles constituting the dielectric layer, a specific permittivity $\in$s, a dielectric loss tanδ, CR product, breakdown voltage $V_B$, capacitance-temperature characteristic TC, lifetime characteristics, and variation of lifetime characteristics (m value) were evaluated.

Average Particle Size of Dielectric Particles

After polishing and etching of the capacitor sample, the polished faces were observed with scanning electron microscope (SEM), and by a coding method, assuming the shape of the dielectric particle as a sphere, the average particle size of the dielectric particles was determined. The results are shown in Table 2.

Specific Permittivity $\in$s

For the capacitor sample, capacitance at reference temperature of 25° C. was measured with digital LCR meter (4274A by YHP) under the conditions of frequency at 1 kHz and input signal level (measured voltage) at 1 Vrms. Then, a specific permittivity (no unit) was calculated based on the obtained capacitance. The results are shown in Table 2.

Dielectric Loss tan δ

For the capacitor sample, a dielectric loss tan δ at reference temperature of 25° C. was measured with digital LCR meter (4274A by YHP) under the condition of frequency at 1 kHz and input signal level (measured voltage) at 1 Vrms. The results are shown in Table 2.

CR Product

After applying direct voltage of 5 V/μm for 1 minute at 20° C. to the capacitor sample, insulating resistance IR was measured with insulating-resistance tester (R8340A by ADVANTEST CORPORATION). CR product was determined by multiplying the above-measured capacitance C (unit: μF) by insulating resistance IR (unit: MΩ). The results are shown in Table 2.

Breakdown Voltage $V_B$

When applying voltage at pressure rising rate of 50V/sec to the capacitor sample, the value of the voltage at detection current of 200 mA was breakdown voltage $V_B$ (unit: V). The results are shown in Table 2.

Capacitance-Temperature Characteristic TC

For the capacitor sample, capacitance was measured with digital LCR meter (4274A by YHP) under the conditions of frequency at 1 kHz and input signal level (measured voltage) at 1 Vrms. Making the reference temperature 25° C., capacitor change rate to temperature (ΔC/C) in the temperature range of −55 to 85° C. was measured to evaluate capacitance-temperature characteristic TC. In the present example, samples satisfying capacitor change rate to temperature within ±15% in the temperature range of −55 to 85° C. (X5R characteristics of EIA standard) were evaluated as GOOD. The results are shown in Table 2.

Lifetime Characteristics, Variation of Lifetime Characteristics

While applying direct voltage under electric field of 25 V/μm at 160° C. to the capacitor sample, lifetime was measured to evaluate lifetime characteristics. In the present example, time from starting of applying the voltage until dropping the insulating resistance by 1 digit was defined as lifetime. The lifetime test was performed on 50 capacitor samples to determine MTTF (μ value in Weibull analysis), for evaluation of the lifetime characteristics. In the present example, samples with MTTF (μ value in Weibull analysis) of 20 hours or more were evaluated as GOOD.

The lifetime measurement for each capacitor sample in the above lifetime characteristic test was plotted with a horizontal axis of down time and longitudinal axis of natural logarithm of reliability function to obtain a Weibull plot. The m values to show the variation of the lifetime characteristics were obtained based on the Weibull plot to evaluate the variation of the lifetime characteristics. The higher m value indicates the smaller variation of lifetime characteristic. The results are shown in Table 2.

Example 2

Sample No. 2 to 7

Except for changing an amount of $Ca_4Y_6O(SiO_4)_6$ calculated as a conversion of Si and amounts of $SiO_2$, $Y_2O_3$ and CaO (calculated as a conversion of Si, calculated as a conversion of Y and calculated as a conversion of Ca respectively) as shown in Table 2, same procedures were taken to produce the capacitor samples and to evaluate as with Example 1 (Sample No. 2 to 7 in Tables 1 and 2). The obtained results are shown in Table 2.

TABLE 1

| Sample | | $Ca_4Y_6O(SiO_4)_6$ [mol] | $SiO_2$ [mol] | $Y_2O_3$ [mol] | CaO [mol] | MgO [mol] | $Cr_2O_3$ [mol] | $V_2O_5$ [mol] | BaO [mol] | Content Ratio of $Ca_4Y_6O(SiO_4)_6$ [wt %] |
|---|---|---|---|---|---|---|---|---|---|---|
| 1 | Example | 0.60 | 0 | 0.60 | 0 | 1.50 | 0.20 | 0.07 | 0.36 | 100 |
| 2 | Example | 0.54 | 0.06 | 0.66 | 0.04 | 1.50 | 0.20 | 0.07 | 0.36 | 90 |
| 3 | Example | 0.48 | 0.12 | 0.72 | 0.08 | 1.50 | 0.20 | 0.07 | 0.36 | 80 |
| 4 | Example | 0.42 | 0.18 | 0.78 | 0.12 | 1.50 | 0.20 | 0.07 | 0.36 | 70 |
| 5 | Example | 0.36 | 0.24 | 0.84 | 0.16 | 1.50 | 0.20 | 0.07 | 0.36 | 60 |
| 6 | Example | 0.30 | 0.30 | 0.90 | 0.20 | 1.50 | 0.20 | 0.07 | 0.36 | 50 |
| 7 | Comparative Example | 0 | 0.60 | 1.20 | 0.40 | 1.50 | 0.20 | 0.07 | 0.36 | 0 |

In Table 1, an amount of $Ca_4Y_6O(SiO_4)_6$ is calculated as a conversion of Si; amounts of $SiO_2$, $Y_2O_3$ and CaO are calculated as a conversion of Si, Y and Ca, respectively; amounts of MgO, $Cr_2O_3$, $V_2O_5$ and BaO are calculated as a conversion of each oxide. The same can be said for amounts in Table 6.

Also, the ratio of $Ca_4Y_6O(SiO_4)_6$ is a ratio when a total content of Si-containing compounds constituting the dielectric layer calculated as a conversion of Si is 100 wt %. For example, in Sample No. 2, the content of $Ca_4Y_6O(SiO_4)_6$ calculated as a conversion of Si is 0.54 mole, and the content of $SiO_2$ calculated as a conversion of Si is 0.06 mole, so that the total content of Si-containing compounds calculated as a conversion of Si is 0.60 mole. The ratio of $Ca_4Y_6O(SiO_4)_6$ calculated as a conversion of Si is 90 wt % [(0.54/0.60)×100 wt %]. The same can be said for those in Tables 2 to 10.

TABLE 2

| Sample | | Ratio of $Ca_4Y_6O(SiO_4)_6$ [wt %] | Average Particle Size [μm] | specific permittivity $\epsilon s$ | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 1 | Example | 100 | 0.25 | 3062 | 4.9 | 1510 | 226 | −14.6 | −2.5 | 53 | 4.5 |
| 2 | Example | 90 | 0.25 | 3053 | 5.0 | 1510 | 222 | −14.5 | −2.7 | 46 | 4.1 |
| 3 | Example | 80 | 0.25 | 3041 | 5.0 | 1509 | 220 | −14.4 | −2.8 | 35 | 3.9 |
| 4 | Example | 70 | 0.25 | 3032 | 5.1 | 1512 | 218 | −14.2 | −2.8 | 32 | 3.8 |
| 5 | Example | 60 | 0.25 | 3050 | 5.0 | 1503 | 215 | −14.3 | −3.0 | 27 | 3.4 |
| 6 | Example | 50 | 0.25 | 3042 | 5.1 | 1505 | 213 | −14.1 | −3.6 | 25 | 2.8 |
| 7 | Comparative Example | 0 | 0.25 | 3037 | 5.2 | 1495 | 187 | −14.6 | −4.3 | 12 | 1.3 |

Evaluation 1

As shown in Table 2, by using $Ca_4Y_6O(SiO_4)_6$, i.e., the form of the composite oxide obtained by pre-reacting raw materials, while keeping a specific permittivity, a dielectric loss, CR product and capacitance-temperature characteristics favorable, breakdown voltage and lifetime characteristic can be improved as well. Furthermore, it is confirmed that m values showing variation of lifetime characteristics can be increased, and that the highly reliable capacitor samples can be obtained. Based on the results of Sample No. 2 to 6, it is also confirmed that similar effects can be obtained when using both $Ca_4Y_6O(SiO_4)_6$ and $SiO_2$ in the pre-determined ratios.

On the other hand, Sample No. 7, wherein $SiO_2$ was added as a Si compound instead of $Ca_4Y_6O(SiO_4)_6$, results in no improvement effects of breakdown voltage and lifetime characteristic. Also, in Sample No. 7, m value showing the variation of the lifetime characteristic is low.

Example 3

Sample No. 11

Except for using $Ca_4Ho_6O(SiO_4)_6$ and $Ho_2O_3$ instead of $Ca_4Y_6O(SiO_4)_6$ and $Y_2O_3$, respectively, a capacitor sample was produced as with Sample No. 1 of Example 1, and evaluated as with Example 1. The results are shown in Table 3.

Example 4

Sample No. 12

Except for using $Ho_2O_3$ instead of $Y_2O_3$, a capacitor sample was produced as with Sample No. 7 of Example 2, and evaluated as with Example 1. The results are shown in Table 3.

Example 5

Sample No. 21

Except for using $Ca_4Dy_6O(SiO_4)_6$ and $Dy_2O_3$ instead of $Ca_4Y_6O(SiO_4)_6$ and $Y_2O_3$, respectively, a capacitor sample was produced as with Sample No. 1 of Example 1, and evaluated as with Example 1. The results are shown in Table 4.

Example 6

Sample No. 22

Except for using $Dy_2O_3$ instead of $Y_2O_3$, a capacitor sample was produced as with Sample No. 7 of Example 2, and evaluated as with Example 1. The results are shown in Table 4.

TABLE 3

| Sample | | Ratio of $Ca_4Ho_6O(SiO_4)_6$ [wt %] | Average Particle Size [μm] | specific permittivity $\epsilon s$ | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 11 | Example | 100 | 0.25 | 3072 | 5.2 | 1560 | 230 | −14.8 | −3.0 | 55 | 4.2 |
| 12 | Comparative Example | 0 | 0.25 | 3041 | 5.4 | 1512 | 183 | −14.2 | −4.2 | 15 | 1.0 |

TABLE 4

| Sample | | Ratio of $Ca_4Dy_6O(SiO_4)_6$ [wt %] | Average Particle Size [μm] | specific permittivity $\epsilon s$ | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 21 | Example | 100 | 0.25 | 3089 | 5.3 | 1610 | 215 | −14.9 | −2.7 | 48 | 5.2 |
| 22 | Comparative Example | 0 | 0.25 | 3067 | 5.5 | 1545 | 179 | −14.6 | −4.5 | 9 | 1.2 |

Evaluation 2

From Tables 3 and 4, it can be confirmed to obtain the similar results when using $Ca_4Ho_6O(SiO_4)_6$ and $Ca_4Dy_6O(SiO_4)_6$, respectively, instead of $Ca_4Y_6O(SiO_4)_6$.

Example 7

Sample No. 31 to 34

Except for using $BaSiO_3$ (Sample No. 31), $CaSiO_3$ (Sample No. 32), $(Ba_{0.5}Ca_{0.5})SiO_3$ (Sample No. 33) and $Y_2SiO_5$ (Sample No. 34), respectively, instead of $Ca_4Y_6O(SiO_4)_6$ (note that each amount calculated as a conversion of Si was 0.6 mole), a capacitor sample was produced as with Sample No. 1 of Example 1, and evaluated as with Example 1. The results are shown in Table 5. Note that in each sample of Example 7, the amount of $Y_2O_3$ was modified appropriately so that the content calculated as a conversion of Y of Y-containing compound in the dielectric layer was equal to that in Sample No. 1 of Example 1.

Evaluation 3

Table 5 shows that the improvement effects of breakdown voltage and lifetime characteristic were not obtained when using $BaSiO_3$, $CaSiO_3$, $(Ba_{0.5}Ca_{0.5})SiO_3$ and $Y_2SiO_5$, respectively, instead of $Ca_4Y_6O(SiO_4)_6$. Also, in Sample No. 34, although lifetime characteristic was improved, m value showing the variation of lifetime characteristics was lowered, resulting in lower reliability.

Example 8

Sample No. 41 to 47

Except for changing an amount of each subcomponent to the value shown in Table 6, a capacitor sample was produced as with Examples 1 and 2, and evaluated as with Example 1 (Sample No. 41 to 47 in Tables 6 and 7). The obtained results are shown in Table 7.

TABLE 5

| Sample | | Si-containing Compound | Average Particle Size [μm] | specific permittivity $\epsilon s$ | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 31 | Comparative Example | $BaSiO_3$ | 0.25 | 3038 | 5.2 | 1519 | 201 | −14.2 | −3.9 | 13 | 1.5 |
| 32 | Comparative Example | $CaSiO_3$ | 0.25 | 3036 | 5.1 | 1509 | 196 | −14.0 | −4.0 | 10 | 1.7 |
| 33 | Comparative Example | $(Ba_{0.5}Ca_{0.5})SiO_3$ | 0.25 | 3041 | 5.0 | 1506 | 205 | −14.1 | −3.3 | 17 | 2.0 |
| 34 | Comparative Example | $Y_2SiO_5$ | 0.25 | 3059 | 4.9 | 1517 | 215 | −14.5 | −2.6 | 23 | 1.9 |

TABLE 6

| Sample | | $Ca_4Y_6O(SiO_4)_6$ [mol] | $SiO_2$ [mol] | $Y_2O_3$ [mol] | CaO [mol] | MgO [mol] | $Cr_2O_3$ [mol] | $V_2O_5$ [mol] | BaO [mol] | Content Ratio of $Ca_4Y_6O(SiO_4)_6$ [wt %] |
|---|---|---|---|---|---|---|---|---|---|---|
| 41 | Example | 0.18 | 0 | 1.82 | 0 | 1.50 | 0.20 | 0.05 | 0.11 | 100 |
| 42 | Example | 0.162 | 0.018 | 1.838 | 0.060 | 1.50 | 0.20 | 0.05 | 0.11 | 90 |
| 43 | Example | 0.144 | 0.036 | 1.856 | 0.072 | 1.50 | 0.20 | 0.05 | 0.11 | 80 |
| 44 | Example | 0.126 | 0.054 | 1.874 | 0.084 | 1.50 | 0.20 | 0.05 | 0.11 | 70 |
| 45 | Example | 0.108 | 0.072 | 1.892 | 0.096 | 1.50 | 0.20 | 0.05 | 0.11 | 60 |
| 46 | Example | 0.09 | 0.09 | 1.91 | 0.108 | 1.50 | 0.20 | 0.05 | 0.11 | 50 |
| 47 | Comparative Example | 0 | 0.18 | 2.00 | 0.12 | 1.50 | 0.20 | 0.05 | 0.11 | 0 |

TABLE 7

| Sample | | Ratio of $Ca_4Y_6O(SiO_4)_6$ [wt %] | Average Particle Size [μm] | specific permittivity $\epsilon s$ | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 41 | Example | 100 | 0.45 | 4056 | 5.4 | 1455 | 121 | −14.5 | −0.4 | 44 | 4.2 |
| 42 | Example | 90 | 0.45 | 4044 | 5.3 | 1455 | 118 | −14.4 | −0.4 | 38 | 3.4 |
| 43 | Example | 80 | 0.45 | 4029 | 5.3 | 1454 | 117 | −14.3 | −0.4 | 29 | 2.9 |
| 44 | Example | 70 | 0.45 | 4017 | 5.4 | 1457 | 116 | −14.1 | −0.3 | 26 | 2.8 |
| 45 | Example | 60 | 0.45 | 4041 | 5.3 | 1448 | 115 | −14.2 | −0.2 | 22 | 2.5 |
| 46 | Example | 50 | 0.45 | 4030 | 5.4 | 1450 | 114 | −14.0 | −0.2 | 20 | 2.5 |
| 47 | Comparative Example | 0 | 0.45 | 4018 | 5.3 | 1433 | 101 | −14.2 | −0.1 | 7 | 1.0 |

Evaluation 4

From Tables 6 and 7, it can be confirmed to obtain similar results when changing the component ratios of the dielectric ceramic composition in the dielectric layer.

Example 9

Sample No. 51

Except for using $Ca_4Ho_6O(SiO_4)_6$ and $Ho_2O_3$ instead of $Ca_4Y_6O(SiO_4)_6$ and $Y_2O_3$, respectively, a capacitor sample was produced as with Sample No. 41 of Example 8, and evaluated as with Example 1. The results are shown in Table 8.

Example 10

Sample No. 52

Except for using $Ho_2O_3$ instead of $Y_2O_3$, a capacitor sample was produced as with Sample No. 47 of Example 8, and evaluated as with Example 1. The results are shown in Table 8.

Example 11

Sample No. 61

Except for using $Ca_4Dy_6O(SiO_4)_6$ and $Dy_2O_3$, respectively, instead of $Ca_4Y_6O(SiO_4)_6$ and $Y_2O_3$, a capacitor sample was produced as with Sample No. 41 of Example 8, and evaluated as with Example 1. The results are shown in Table 9.

Example 12

Sample No. 62

Except for using $Dy_2O_3$ instead of $Y_2O_3$, a capacitor sample was produced as with Sample No. 47 of Example 8, and evaluated as with Example 1. The results are shown in Table 9.

TABLE 8

| Sample | | Ratio of $Ca_4Ho_6O(SiO_4)_6$ [wt %] | Average Particle Size [μm] | specific permittivity $\epsilon s$ | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 51 | Example | 100 | 0.45 | 4057 | 5.2 | 1456 | 120 | −14.3 | 0.3 | 48 | 3.9 |
| 52 | Comparative Example | 0 | 0.45 | 4023 | 5.3 | 1423 | 102 | −14 | −0.7 | 5 | 1.1 |

TABLE 9

| Sample | | Ratio of $Ca_4Dy_6O(SiO_4)_6$ [wt %] | Average Particle Size [μm] | specific permittivity ∈s | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 61 | Example | 100 | 0.45 | 4055 | 5.2 | 1521 | 125 | −14 | −0.3 | 39 | 4.3 |
| 62 | Comparative Example | 0 | 0.45 | 4025 | 5.5 | 1446 | 99 | −14.6 | −0.5 | 7 | 1.2 |

Evaluation 5

From Tables 8 and 9, it can be confirmed to obtain similar results when changing the constitution of the dielectric ceramic composition in the dielectric layer.

Example 13

Sample No. 71 to 74

Except for using $BaSiO_3$ (Sample No. 71), $CaSiO_3$ (Sample No. 72), $(Ba_{0.5}Ca_{0.5})SiO_3$ (Sample No. 73), and $Y_2SiO_5$ (Sample No. 74), respectively, instead of $Ca_4Y_6O(SiO_4)_6$ (note that the amounts calculated as a conversion of Si were 0.18 mole in all cases), a capacitor sample was produced as with Sample No. 41 of Example 8, and evaluated as with Example 1. The results are shown in Table 10. Note that in each sample in Example 13, the amount of $Y_2O_3$ was modified appropriately so that the content calculated as a conversion of Y of Y-containing compound in the dielectric layer was equal to that in Sample No. 41 of Example 8.

TABLE 10

| Sample | | Si-containing Compound | Average Particle Size [μm] | specific permittivity ∈s | tan δ [%] | CR Product [ΩF] | VB [V/μm] | TC (85° C.) [%] | TC (−55° C.) [%] | MTTF μ [hr] | m value |
|---|---|---|---|---|---|---|---|---|---|---|---|
| 71 | Comparative Example | $BaSiO_3$ | 0.45 | 4020 | 5.3 | 1456 | 106 | −13.9 | 0.0 | 8 | 1.2 |
| 72 | Comparative Example | $CaSiO_3$ | 0.45 | 4016 | 5.2 | 1424 | 103 | −14.0 | 0.2 | 6 | 1.4 |
| 73 | Comparative Example | $(Ba_{0.5}Ca_{0.5})SiO_3$ | 0.45 | 4025 | 5.2 | 1430 | 110 | −14.3 | −0.3 | 10 | 1.7 |
| 74 | Comparative Example | $Y_2SiO_5$ | 0.45 | 4041 | 5.3 | 1443 | 116 | −14.6 | −0.2 | 19 | 1.9 |

Evaluation 6

From Table 10, when using $BaSiO_3$, $CaSiO_3$, $(Ba_{0.5}Ca_{0.5})SiO_3$, and $Y_2SiO_5$, respectively, instead of $Ca_4Y_6O(SiO_4)_6$, it can be confirmed that no improvement effects in breakdown voltage and lifetime characteristic are obtained as well even if changing component ratios of the dielectric ceramic composition of the dielectric layer.

Example 14

Measurement of Distributions of $Y_2O_3$ and $SiO_2$ in Dielectric Particle

Figure 2A:
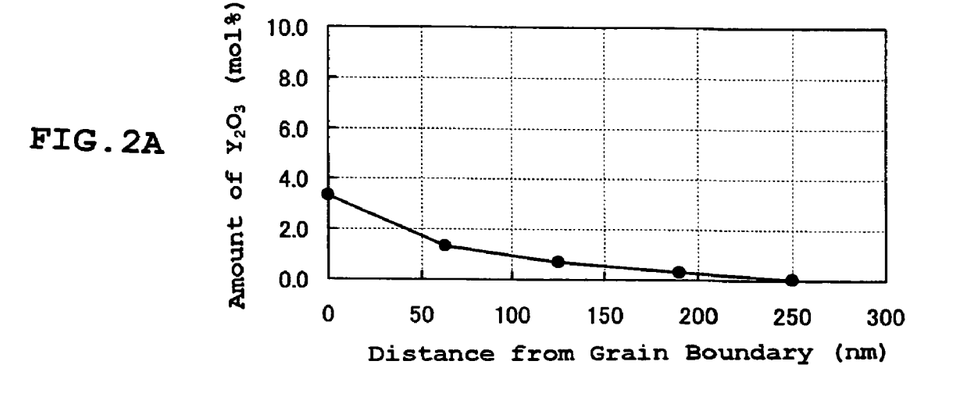
FIG. 2A is a graph showing distribution of $Y_2O_3$ in dielectric particles according to an example of the present invention.
Figure 2B:
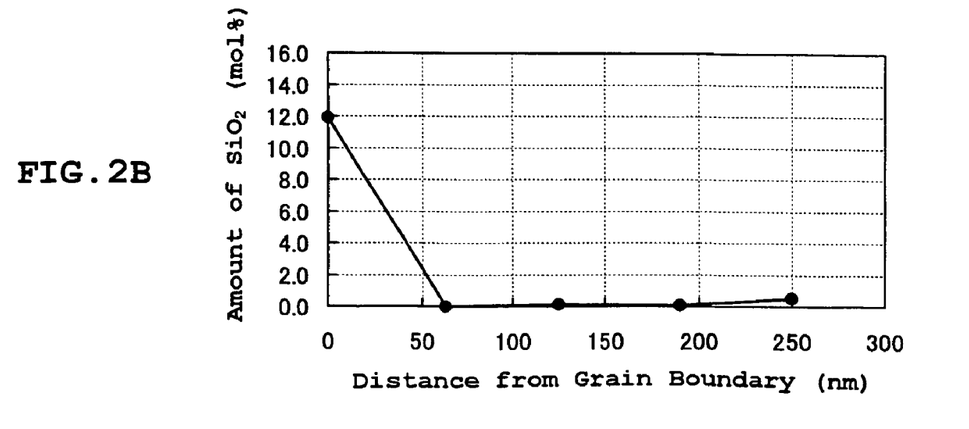
FIG. 2B is a graph showing distribution of $SiO_2$ in dielectric particles according to an example of the present invention.

For Sample No. 1 of Example 1, distributions of $Y_2O_3$ and $SiO_2$ in dielectric particle were measured by the following method:

Namely, at first, a capacitor sample was cut in a direction vertical to the dielectric layer 2. Then, for the cutting surface, content ratios of $Y_2O_3$ and $SiO_2$ from grain boundary to grain inside were measured by transmission electron microscope (TEM). The obtained results are shown in FIG. 2A and FIG. 2B. Note that FIG. 2A is a graph showing distribution of $Y_2O_3$ in dielectric particles, and that FIG. 2B is a graph showing distribution of $SiO_2$ in dielectric particles. From FIG. 2A and FIG. 2B, it can be confirmed that diffusive phases wherein $Y_2O_3$ and $SiO_2$ were distributed near the surfaces of dielectric particles were formed in Example of the present invention. By forming the diffusive phases, it is possible to improve breakdown voltage and lifetime characteristic, and further to increase m value showing variation of lifetime characteristics, which may result in a highly-reliable capacitor sample.

The invention claimed is:

1. A production method of a dielectric ceramic composition at least including a main component including a dielectric oxide having perovskite-type crystal structure expressed by a formula $ABO_3$ (note that in the formula, "A" indicates one or more elements selected from Ba, Ca, Sr and Mg, and that "B" indicates one or more elements selected from Ti, Zr and Hf), comprising steps of:
   preparing a main component material including said dielectric oxide expressed by $ABO_3$;
   preparing a subcomponent material including a composite oxide expressed by $M_4R_6O(SiO_4)_6$ (note that "M" indicates at least one selected from Ca and Sr, and that "R" indicates at least one selected from Sc, Y, La, Ce, Pr, Nd, Pm, Sm, Eu, Gd, Tb, Dy, Ho, Er, Tm, Yb and Lu);
   after preparing the main component material and the subcomponent material mixing said main component material and subcomponent material to obtain a dielectric ceramic composition material; and
   firing said dielectric ceramic composition material.

2. The production method of a dielectric ceramic composition as set forth in claim 1, wherein
in said composite oxide expressed by $M_4R_6O(SiO_4)_6$, "M" is Ca, and "R" is at least one selected from Y, Ho, Dy, Gd, Yb and Tb.

3. The production method of a dielectric ceramic composition as set forth in claim 1, wherein
said dielectric oxide expressed by $ABO_3$ is barium titanate.

4. The production method of a dielectric ceramic composition as set forth in claim 1, wherein
said subcomponent material further includes an oxide of Mg and an oxide of Ba.

5. The production method of a dielectric ceramic composition as set forth in claim 1, wherein
when a content of Si-containing compound included in said dielectric ceramic composition, calculated as a conversion weight percent of the Si element in the oxide, is 100 wt %, 50 to 100 wt % of Si-containing compound included in said dielectric ceramic composition is added to said dielectric ceramic composition material in a form of said $M_4R_6O(SiO_4)_6$.

6. A production method of an electronic device having a dielectric layer, comprising steps of:
preparing a main component material including a dielectric oxide having perovskite-type crystal structure expressed by a formula $ABO_3$ (note that in the formula, "A" indicates one or more elements selected from Ba, Ca, Sr and Mg, and "B" indicates one or more elements selected from Ti, Zr and Hf);
preparing a subcomponent material including a composite oxide expressed by $M_4R_6O(SiO_4)_6$ (note that "M" indicates at least one selected from Ca and Sr, and "R" indicates at least one selected from Sc, Y, La, Ce, Pr, Nd, Pm, Sm, Eu, Gd, Tb, Dy, Ho, Er, Tm, Yb and Lu);
after preparing the main component material and the subcomponent material mixing said main component material and subcomponent material to obtain a dielectric ceramic composition material;
mixing said dielectric ceramic composition material, an organic binder, and a solvent to obtain a dielectric paste;
obtaining a ceramic green sheet by using said dielectric paste;
stacking a plurality of said ceramic green sheets to obtain a green chip; and
firing said green chip.

7. The production method of a dielectric ceramic composition as set forth in claim 2, wherein
said dielectric oxide expressed by $ABO_3$ is barium titanate.

8. The production method of a dielectric ceramic composition as set forth in claim 2, wherein
said subcomponent material further includes an oxide of Mg and an oxide of Ba.

9. The production method of a dielectric ceramic composition as set forth in claim 2, wherein
when a content of Si-containing compound included in said dielectric ceramic composition, calculated as a conversion weight percent of the Si element in the oxide, is 100 wt %, 50 to 100 wt % of Si-containing compound included in said dielectric ceramic composition is added to said dielectric ceramic composition material in a form of said $M_4R_6O(SiO_4)_6$.

* * * * *